(12) United States Patent
Fargeix et al.

(10) Patent No.: US 8,263,317 B2
(45) Date of Patent: Sep. 11, 2012

(54) FORMATION OF DEEP HOLLOW AREAS AND USE THEREOF IN THE PRODUCTION OF AN OPTICAL RECORDING MEDIUM

(75) Inventors: Alain Fargeix, Meylan (FR); Brigitte Martin, Saint-Egrève (FR)

(73) Assignee: Commissariat a l'Energie Atomique, Paris (FR)

( * ) Notice: Subject to any disclaimer, the term of this patent is extended or adjusted under 35 U.S.C. 154(b) by 560 days.

(21) Appl. No.: 12/312,925

(22) PCT Filed: Dec. 4, 2007

(86) PCT No.: PCT/FR2007/001988
§ 371 (c)(1),
(2), (4) Date: Jun. 1, 2009

(87) PCT Pub. No.: WO2008/074947
PCT Pub. Date: Jun. 26, 2008

(65) Prior Publication Data
US 2010/0059477 A1 Mar. 11, 2010

(30) Foreign Application Priority Data
Dec. 8, 2006 (FR) .................................... 06 10736

(51) Int. Cl.
*C23F 1/00* (2006.01)
(52) U.S. Cl. .......... 430/321; 216/48; 430/322; 430/323; 430/324
(58) Field of Classification Search .................. None
See application file for complete search history.

(56) References Cited

U.S. PATENT DOCUMENTS

| 5,501,926 A * | 3/1996 | Cheng et al. ...................... 430/5 |
| 6,242,162 B1 * | 6/2001 | Ro et al. ........................ 430/321 |
| 7,955,786 B2 * | 6/2011 | Sumioka ....................... 430/321 |
| 2004/0209199 A1 | 10/2004 | Kishima et al. |
| 2004/0241589 A1 * | 12/2004 | Ito et al. ........................ 430/321 |
| 2005/0045587 A1 * | 3/2005 | Kawaguchi et al. ............. 216/65 |
| 2005/0063289 A1 * | 3/2005 | Tomiyama et al. ........ 369/270.1 |

(Continued)

FOREIGN PATENT DOCUMENTS
DE 19938072 * 3/2000
EP 0 596 439 A2 5/1994

(Continued)

OTHER PUBLICATIONS

"Single Level, multi material bubble domain", IBM Tech Discl. vol. 21(3) pp. 1287-1288 (Aug. 1978).*

*Primary Examiner* — Martin Angebranndt
(74) *Attorney, Agent, or Firm* — Oliff & Berridge, PLC

(57) ABSTRACT

At least one hollow zone is formed in a stack of at least one upper layer and one lower layer. The upper layer is patterned to form at least a first hollow region passing through said upper layer. The first hollow region is extended by a second hollow region formed in the lower layer by etching through an etching mask formed on the patterned upper layer. The etching mask is formed by a resin layer, positively photosensitive to an optic radiation of a predetermined wavelength, exposed to the said optic radiation through the stack and developed. The lower and upper layers of the stack are respectively transparent and opaque to said predetermined wavelength so that the patterned upper layer acts as exposure mask for the resin layer.

12 Claims, 4 Drawing Sheets

U.S. PATENT DOCUMENTS

| | | | |
|---|---|---|---|
| 2005/0106508 A1* | 5/2005 | Shintani et al. | 430/322 |
| 2006/0110568 A1* | 5/2006 | Edwards | 428/64.4 |
| 2007/0217322 A1* | 9/2007 | Hanaoka et al. | 369/284 |

FOREIGN PATENT DOCUMENTS

| | | | |
|---|---|---|---|
| EP | 1492102 | * | 12/2004 |
| EP | 1691362 | * | 8/2006 |
| JP | 05-323568 | * | 12/1993 |
| JP | 06-051489 | * | 2/1994 |
| JP | 2005-343115 | * | 12/2005 |
| WO | WO 2005/101398 A1 | | 10/2005 |
| WO | 2006/045332 | * | 5/2006 |

* cited by examiner

FORMATION OF DEEP HOLLOW AREAS AND USE THEREOF IN THE PRODUCTION OF AN OPTICAL RECORDING MEDIUM

BACKGROUND OF THE INVENTION

The invention relates to a method for forming at least one hollow zone in a stack of at least one upper layer and one lower layer and use of such a method in fabrication of an optic recording medium.

STATE OF THE ART

Optic recording discs or media generally comprise at least one polycarbonate substrate comprising raised and recessed (or hollow) zones referred to as lands and hollow regions and corresponding to information data. The substrates thus comprise a patterned free surface with a predetermined pattern.

Such substrates are generally manufactured in large quantities by injection molding using a mold or a master disk also known as "stamper". One of the free surfaces of the stamper is patterned in complementary manner to the predetermined pattern required for the substrates. The master disk is obtained from an original model. For example, the patent application US-A-2005/0045587 describes a method whereby the original model used for fabrication of optic discs can be produced and also describes the fabrication method of said optic discs. The original model is achieved from a stack comprising a substrate, for example made of glass or silicon, and a layer of heat-sensitive material. The heat-sensitive material is an antimony oxide able to change state when heating takes place by exposure of said layer to light. The free surface of the heat-sensitive material layer is then patterned by exposing certain areas of said free surface to a laser beam and removing said exposed areas. Such an operation thereby enables lands and pits to be formed in the heat-sensitive material layer. The original model obtained is then used to form a metal master disc designed to act as mold for fabrication of optic discs by injection molding.

Alternative embodiments for forming original models exist. Thus, in the patent application US-2004/0209199, the heat-sensitive material layer is formed by two superposed sub-layers of distinct materials, for example copper and aluminum. Areas of the stack formed by the two sub-layers are then exposed to a laser beam via the free surface of the stack. The heating caused by the laser beam causes a diffusion or a dissolution of the two materials so as to form a region composed of a material coming from the mixture or from the reaction of the initial two materials. Once the stack has been patterned, the latter can act as mask for etching small convex and concave marks in the substrate. The patterned layer is then removed and the substrate etched in this way is used as original model.

Since the development of the data storage mode on optic recording media, in particular on media of Compact Disc or CD type, the dimensions of the patterns to be inscribed have been reduced on several occasions. Yet for one of the latest generations of optic recording media using a blue laser, better known under the name of Blu-Ray discs, recent developments are tending towards formation of deeper pits in the substrate than for usual media. The depth envisaged for Blu-Ray disc pits is about 80 nm for Read Only Memories (ROM) whereas, for recordable discs (CD-R) and rewritable discs (CD-RW), it is about 40 nm. Conventional methods for producing the models for optic recording media, as described for example in US Patent application US-A-2005/0045587, do not enable lands presenting such a depth level to be obtained. The phase change caused by heating is effectively limited to the surface level of the heat-sensitive material layer and does not enable deep patterning of said layer. The thickness of the heat-sensitive material layer is often calculated such as to optimize the thermal response of the material. However, as the regions to be exposed generally have to present a small width, this response is limited in penetration depth. A large thermal penetration depth would involve a large increase of the width of the area to be exposed and a lengthening of the exposure time, which also contributes to broadening of the exposed areas, which is not acceptable.

In Patent application WO-A-2005/101398, it has been proposed to increase the depth of the pits by arranging an intermediate layer between the heat-sensitive material layer and the substrate, which intermediate layer is designed to be patterned to extend the pits formed in the heat-sensitive material layer. The intermediate layer can be a resin layer photosensitive to ultraviolet radiation and more particularly Diazonaphthoquinone-based. The heat-sensitive material layer is then used as mask for exposure and development of said intermediate layer. Patterning of the intermediate layer is thus performed through the heat-sensitive material layer, which is itself patterned, the radiation reaching said heat-sensitive material layer via its free surface. A heat-dissipating metal layer may if required be arranged between the intermediate layer and substrate so as to control the heat accumulation liable to occur during data writing. If there is no metal layer between the intermediate layer and substrate, the free regions of the substrate, i.e. the regions of the substrate coinciding with the pits formed in the heat-sensitive material layer and in the intermediate layer, can be etched to increase the depth of the pits even further. In this case, the heat-sensitive material layer forms an etching mask for the substrate.

Such a method enables deeper pits to be obtained than conventional methods. However, it presents at least two major shortcomings. Firstly, the intermediate resin layer generally has to be subjected to high-temperature hardening treatment in order for deposition of the heat-sensitive material layer to be able to be performed. But such a heat treatment results in degradation of the photosensitive properties of the resin, which may be detrimental to subsequent patterning. Likewise, exposure of the heat-sensitive material layer may impair the properties of the intermediate layer located under said layer. Finally, with such a method, if the substrate has to be etched, the heat-sensitive material layer acts as etching mask. Such a mask is however not well-suited to the dry or wet etching devices usually used in the microelectronics field.

In a more general manner, the problem relating to obtaining deep pits arises in other fields than that of optic recording media. This is in particular the case in the lithography field.

OBJECT OF THE INVENTION

The object of the invention is to form deep hollow zones easily in a stack of at least one upper layer and one lower layer, and more particularly when fabricating optic recording media, while at the same time remedying the shortcomings of the prior art.

According to the invention, this object is achieved by the accompanying claims and more particularly by the fact that the method comprises the following successive steps:

i) patterning of the upper layer to form at least a first hollow region passing through said upper layer, ii) formation of an etching mask on the patterned upper layer, consisting:

in depositing a resin layer positively photosensitive to an optic radiation of a predetermined first wavelength on the patterned upper layer, the lower and upper layers of the stack being respectively transparent and opaque to the predetermined first wavelength, in exposing said resin layer to the optic radiation through the stack, and in developing the resin layer, iii) etching the lower layer through said etching mask to form at least a second hollow region extending the first hollow region, iv) and removing said etching mask.

BRIEF DESCRIPTION OF THE DRAWINGS

Other advantages and features will become more clearly apparent from the following description of particular embodiments of the invention given for non-restrictive example purposes only and represented in the appended drawings in which.

DESCRIPTION OF PARTICULAR EMBODIMENTS

At least one hollow zone is formed in a stack of at least two superposed thin layers, respectively called upper layer and lower layer and preferably formed by distinct materials. The upper layer is patterned to form at least a first hollow region passing through said layer. Then the first hollow region is extended by a second hollow region formed in the lower layer, by etching through an etching mask formed beforehand on the patterned upper layer.

In the stack, the upper layer is preferably composed of a material able to change phase or to change state when subjected to heating caused by an optic radiation. The upper layer is for example a thermally stable oxide but sub-stoichiometric, such as a molybdenum oxide ($MoO_x$), or a thermodynamically unstable but super-stoichiometric oxide such as a platinum oxide ($PtO_x$), or a phase change material such as $Ge_2Sb_2Te_5$ also called GST. It is absorbent for an optic radiation wavelength designed to cause heating and therefore a change of state or of phase in said upper layer. The ability of the upper layer to change phase or state when heated is in this case used to pattern said upper layer and therefore to form the first hollow region.

Figure 1:
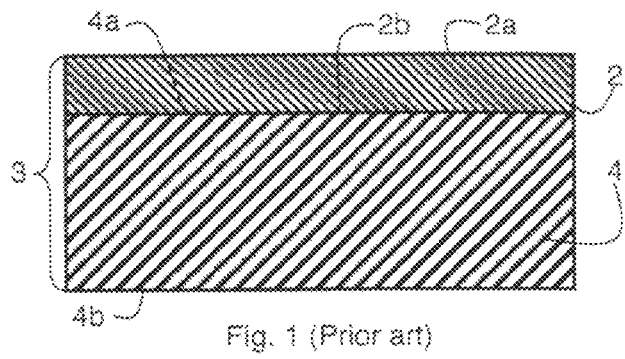
FIGS. 1 to 9 schematically represent a particular embodiment according to the invention, in cross-section.
Figure 2:
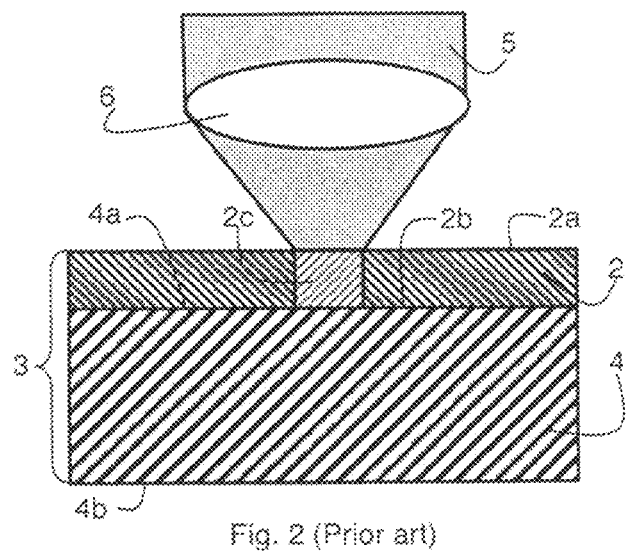
Figure 3:
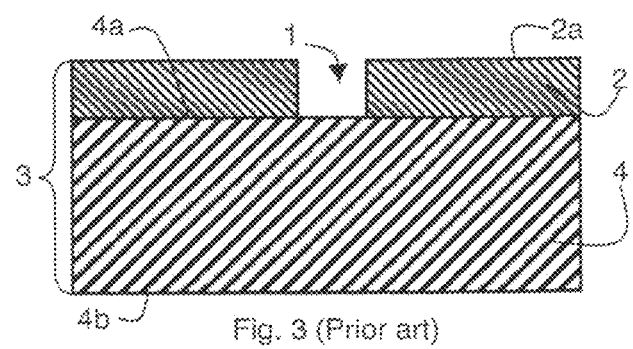

FIGS. 1 to 3 illustrate, for example purposes, formation of a first hollow region 1 in a upper layer 2 of a stack 3.

Stack 3 represented in FIG. 1 is thus constituted by superposition of an upper layer 2 and a lower layer 4 formed for example by a substrate. The lower layer 4 is for example made from silicon oxide. Lower layer 4 can for example also be made from alumina, zircon, quartz or sapphire. Furthermore, the upper layer 2 and the lower layer 4 each comprise a first surface 2a, 4a and a second surface 2b, 4b. Thus, in the stack 3, second surface 2b of upper layer 2 is in contact with first surface 4a of lower layer 4 whereas first surface 2a of upper layer 2 and second surface 4b of lower layer 4 are free and respectively form the front and rear surfaces of said stack 3.

As represented in FIG. 2, upper layer 2 of stack 3 is then locally exposed by an optic radiation 5 of predetermined wavelength λ, from front surface 2a of stack 3. Thus in FIG. 2, an area 2c of upper layer 2 is exposed to the optic radiation 5, focused for example on said area 2c by a lens 6. Optic radiation 5 causes localized heating in area 2c. The heat induced by optic radiation 5 causes a change of phase or state in area 2c whereas the state or phase of the non-exposed part of upper layer 2 is not modified.

After the exposure step, area 2c is thus in a different state or phase from that of the rest of upper layer 2, and preferably in a thermodynamically stable state or phase. For example, for a upper layer 2 initially made of $PtO_x$, area 2c, can be composed of platinum after exposure. For $MoO_x$, area 2c is composed of a mixture of $MoO_2$/Mo after exposure, and for amorphous GST, area 2c is in crystalline form after exposure.

As illustrated in FIG. 3, exposed area 2c of upper layer 2 is then removed to release first hollow region 1 in upper layer 2. Removal of exposed area 2c is performed in conventional manner, for example by dissolution in a solution. This step is generally called developing step. Front surface 2a of stack 3 thus comprises a first region 1 forming an opening passing through upper layer 2 from its first surface 2a to its second surface 2b. The opening created in this way in upper layer 2 thereby enables a part of first surface 4a of lower layer 4 to be released.

First hollow region 1 is then extended by a second hollow region formed in lower layer 4. To do this and as represented in FIGS. 4 to 7, an etching mask 7 is formed on previously patterned upper layer 2.

Figure 4:
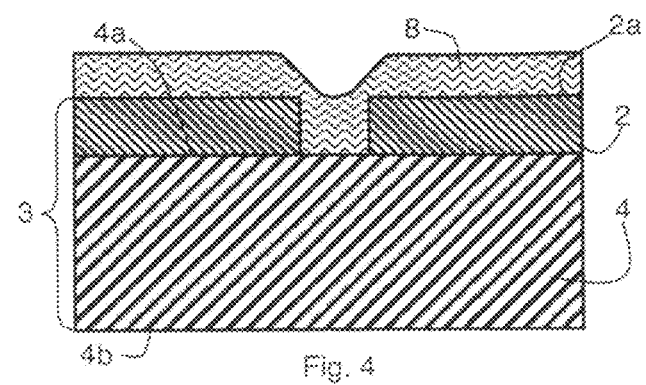

Etching mask 7 is thus formed by depositing a resin layer 8 on front surface 2a of stack 3 and in first hollow region 1. In FIG. 4, resin layer 8 covers first surface 2a of upper layer 2 and the previously released part of first surface 4a of lower layer 4, so that first hollow region 1 is totally filled by said photoresist.

The photoresist is positively photosensitive to optic radiation of different wavelength λ', from that of optic radiation 5 used beforehand to pattern upper layer 2. For example, wavelength λ' used to form etching mask 7 can be about 193 nm, whereas wavelength λ used for patterning upper layer 2 can be about 405 nm. For example, positive photoresist can be a resin marketed under the name of EPIC 2300 (ArF) by RHOM&HASS for a photosensitivity at a wavelength λ' of 193 nm or a resin marketed under the name of UV2400 (KrF) by the same corporation for a photosensitivity at a wavelength λ' of 248 nm.

Lower layer 4 and upper layer 2 of stack 3 are moreover respectively transparent and opaque to wavelength λ' of the optic radiation used to form etching mask 7.

Figure 5:
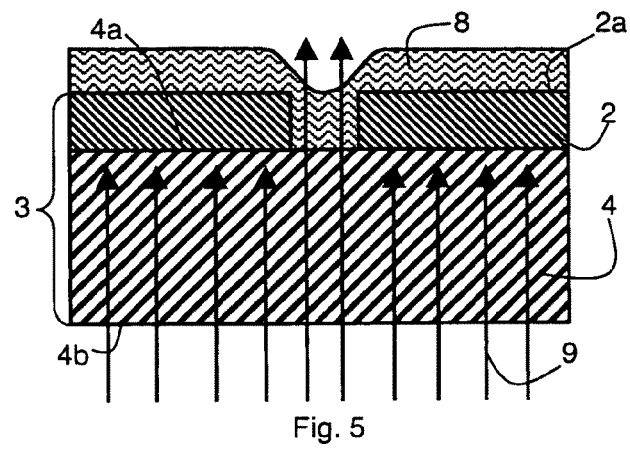
Figure 6:
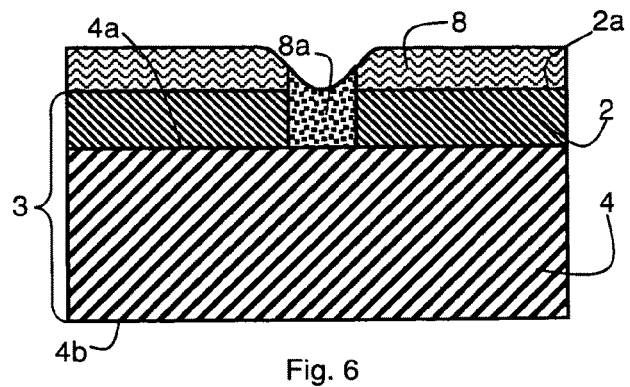

As represented in FIG. 5, resin layer 8 is thus exposed to a light radiation 9 via rear surface 4b of stack 3, so that light radiation 9 passes through stack 3 from rear surface 4b to reach resin layer 8. Exposure is more particularly performed full-wafer so that the whole of rear surface 4b of stack 3 is exposed. Optic radiation 9 passes through lower layer 3 as the latter is transparent to wavelength λ'. Upper layer 2 being opaque to wave-length λ', optic radiation 9 is on the other hand stopped by upper layer 2. Upper layer 2 thereby acts as exposure mask for resin layer 8 so that only the part 8a of resin layer 8 contained in the first hollow region 1 receives optic radiation 9 and is therefore exposed as represented in FIG. 6.

Figure 7:
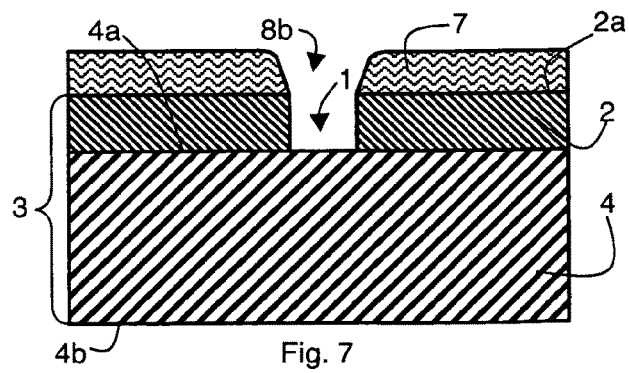

As represented in FIG. 7, resin layer 8 is then developed by eliminating exposed part 8a so as to form etching mask 7. The developing step thus releases first hollow region 1 in upper layer 2 and makes a part of first surface 4a of lower layer 4 again apparent. Moreover, as patterned upper layer 2 acted as exposure mask for resin layer 8, elimination of exposed part 8a causes formation of a complementary hollow region 8b in resin layer 8, which hollow region passes through said resin layer. Complementary hollow region 8b extends first hollow region 1 formed in upper layer 2. The side wall delineating said complementary hollow region 8b is therefore substantially aligned with the wall delineating first hollow region 1.

Figure 8:
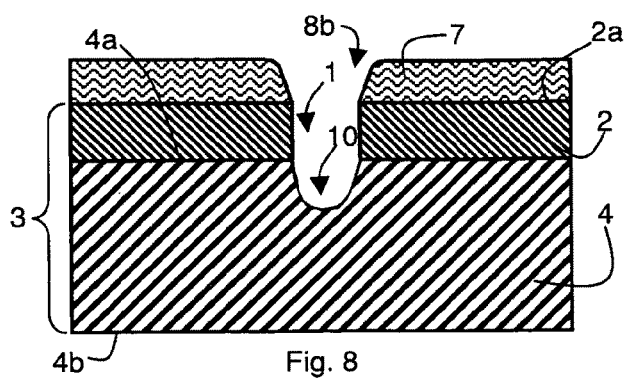

As represented in FIG. 8, once etching mask 7 has been formed, lower layer 4 is etched through said mask 7 to form a second hollow region 10 in lower layer 4. Etching of second hollow region 10 is performed through complementary hollow region 8b and first hollow region 1. Second hollow region 10 therefore extends first hollow region 5a so that the side wall delineating second hollow region 10 is substantially aligned with the side wall of first hollow region 1. The etching technique used can be a dry etching technique in the case of a lower layer 4 made from silicon oxide, and more particularly reactive ion etching (RIE) with an atmosphere containing $SF_6$ and $CHF_3$.

Figure 9:
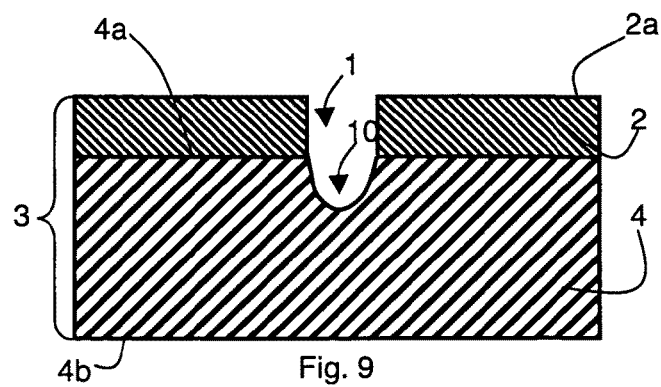
Figure 10:
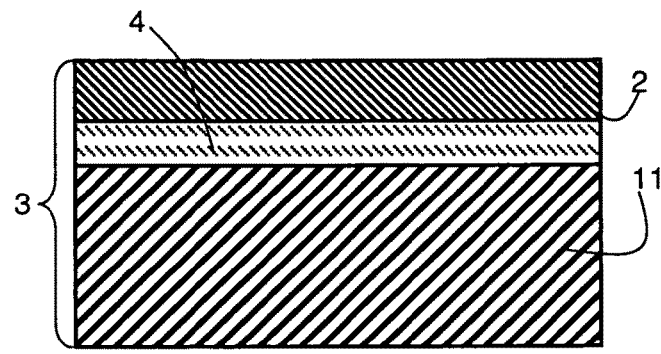
FIGS. 10 to 13 schematically represent different steps of an alternative embodiment according to the invention, in cross-section.

Once etching mask 7 has been removed (FIG. 9), the assembly formed by first and second hollow regions 1 and 10 corresponds to a hollow region presenting a larger depth than that usually obtained with techniques of the prior art. It should be noted that removing the mask 7 can in some cases result in partial removal of upper layer 2, thereby reducing the depth of first hollow region 1. In these cases, the thickness of the lower layer and/or etching of lower layer 3 can be adjusted to obtain the required depth for the hollow region. For example, a hollow region with a depth of about 80 nm can be obtained from a upper layer 2 with a thickness of 30 nm and a resin layer 8 with a thickness of about 70 nm. In these cases, the depth of second hollow region 10 etched in lower layer 4 is about 50 nm.

Etching the lower layer by means of a photoresist etching mask formed by exposure through the lower layer so that the upper layer acts as exposure mask not only enables a deep hollow region area to be obtained but also remedies the drawbacks of the prior art and more particularly of patent application WO-A-2005/101398. The resin layer does not in fact need to undergo high-temperature hardening treatment after deposition thereof and exposure of the upper layer has taken place before deposition of the resin layer. These two factors thereby preserve the photosensitivity properties of the resin layer and improve subsequent patterning thereof to form the etching mask. Furthermore, the method according to the invention enables the usual etching techniques used in the microelectronics field to be used directly.

Etching of the second area is in fact performed by means of an etching mask formed by resin layer 8 and arranged on the upper layer. However, usual etching techniques used in microelectronics always use photoresist masks. In Patent application WO-A-2005/101398, the etching mask is on the other hand formed by the heat-sensitive material layer, arranged on an intermediate layer which may be made from photoresist, which requires the etching techniques to be adapted.

The invention is not limited to the embodiment represented in FIGS. 1 to 9. More particularly, a plurality of hollow zones can be formed simultaneously in stack 3.

Furthermore, stack 3 can comprise more than two thin layers, lower layer 4 remaining the thin layer directly in contact with upper layer 2. As represented in FIGS. 10 to 13, stack 3 in which at least one hollow zone is formed can thus for example successively comprise a upper layer 2, a lower layer 4 and a substrate 11, also transparent to wavelength λ'.

In this case, lower layer 4 is not formed by a substrate but by an intermediate thin layer arranged between upper layer 2 and a substrate 11. Lower layer 4 is preferably formed by a material that is distinct from the material forming substrate 11 and from the material forming upper layer 2. Substrate 11 is for example made from silicon oxide whereas lower layer 4 is a thin layer of alumina or a mixture of zinc sulfide and silicon oxide or silicon nitride.

Figure 11:
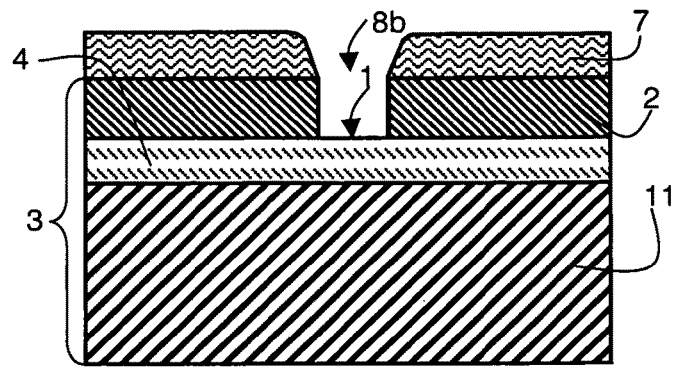
Figure 12:
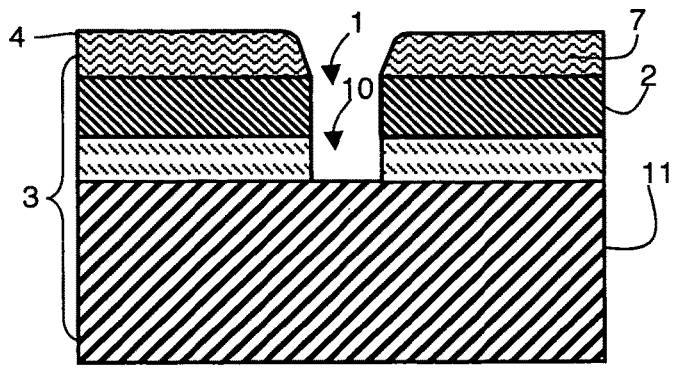
Figure 13:
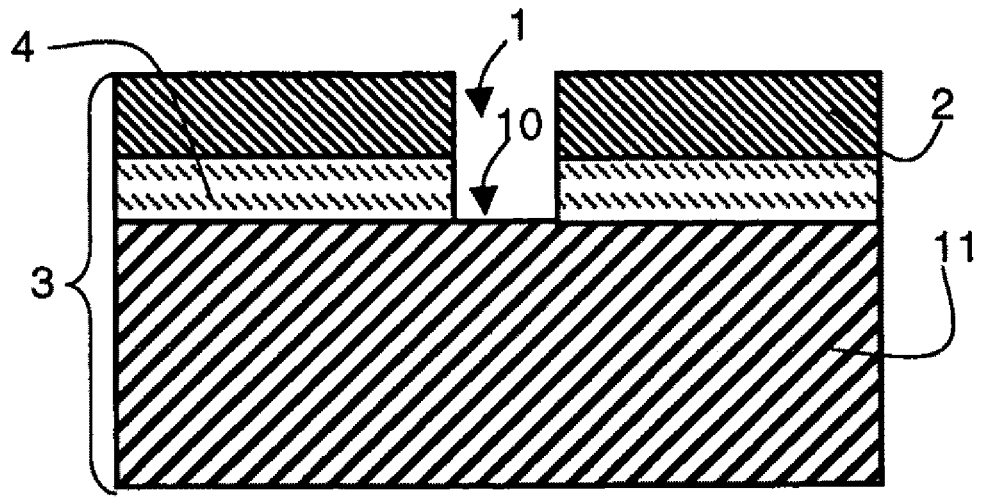
Figure 14:
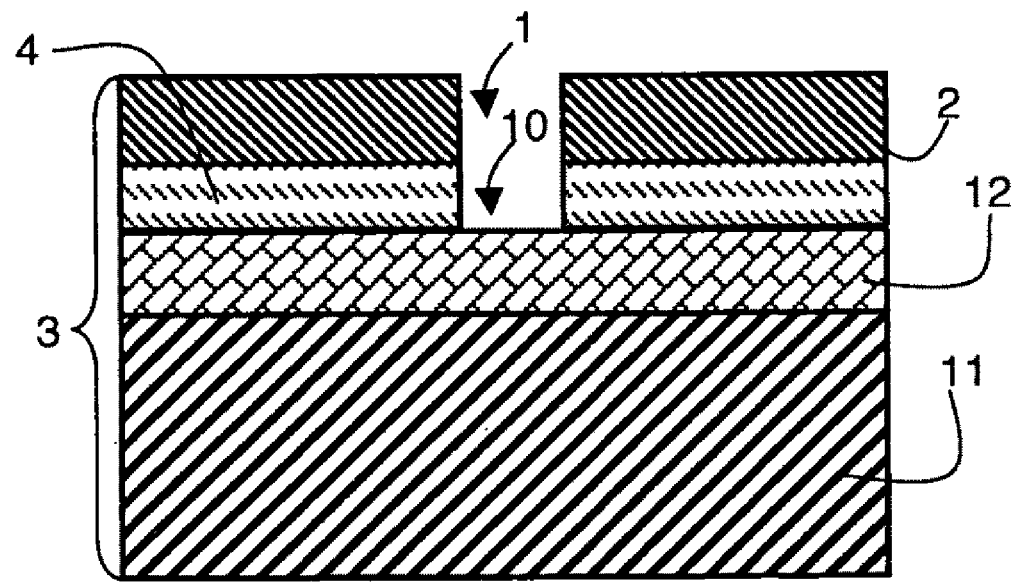
FIG. 14 schematically represents a stack in which deep hollow zones are formed according to another alternative embodiment of the invention.

As represented in FIGS. 11 to 13, the steps of patterning upper layer 2, of forming etching mask 7 and of etching lower layer 4 remain identical to the embodiment described in FIGS. 1 to 9. The depth of the hollow zone formed in the stack corresponds substantially, in FIG. 13, to the sum of the thicknesses of the upper 2 and lower 4 layers. Furthermore, according to a particular embodiment, etching can be extended so as to form a third hollow region (not shown), in substrate 11, extending second hollow region 10. According to another alternative embodiment and as represented in FIG. 14, an additional layer 12, also transparent to wavelength λ', can be arranged between lower layer 4 and substrate 11 to stop etching and protect substrate 11. Additional layer 12 is insensitive to etching of the lower layer and is for example formed by a metallic thin layer, for example made from chromium or silver, with a thickness of about 8 nm for example, or by a layer of silicon nitride with a thickness of about 15 nm or a layer of amorphous silicon with a thickness of about 10 nm.

Such a method can be more particularly used in fabrication of optic recording media and in particular for fabrication of original models.

The invention claimed is:

1. A method for forming at least one hollow zone in a stack of at least one upper layer and one lower layer, comprising the following successive steps:
    patterning of the upper layer to form at least a first hollow region passing through the upper layer,
    forming an etching mask on the patterned upper layer, consisting of:
    depositing a layer of a positive acting photosensitive resin and exposing it to an optic radiation of a predetermined first wavelength, on the patterned upper layer, the lower and upper layers of the stack being respectively transparent and opaque to the predetermined first wavelength, in exposing the positive acting photosensitive resin layer to the optic radiation through the stack,
    developing the positive acting photosensitive resin layer,
    etching the lower layer through the etching mask to form at least a second hollow region extending the first hollow region,
    and removing the etching mask,
    wherein, before the step of patterning the upper layer, the upper layer is formed of a material able to change phase or to change state, due to the action of heating caused by an optic radiation of a predetermined second wavelength different from the first wavelength.

2. The method according to claim 1, wherein the first hollow region is formed by exposing at least one area of the upper layer to an optic radiation of the second wavelength, from the free surface of the upper layer, and by removing the exposed area.

3. The method according to claim 1, wherein the material of the upper layer is selected from the group consisting of thermodynamically stable sub-stoichiometric oxides, thermodynamically unstable super-stoichiometric oxides and phase-change materials.

4. The method according to claim 1, wherein the second wavelength is 405 nm.

5. The method according to claim 1, wherein the first wavelength is 193 nm.

6. The method according to claim 1, wherein the stack comprises a substrate transparent to the first wavelength.

7. The method according to claim 6, wherein the substrate constitutes the lower layer.

8. The method according to claim 7, wherein the substrate is made from silicon oxide, alumina, zircon, sapphire or quartz.

9. The method according to claim 6, wherein the lower layer is arranged between the upper layer and the substrate.

10. The method according to claim 9, wherein the lower layer is a thin layer of alumina or of a mixture of zinc sulfide and silicon oxide or silicon nitride.

11. The method according to claim 9, wherein an additional layer, transparent to the first wavelength and insensitive to etching of the lower layer, is arranged between the lower layer and the substrate.

12. A method for manufacturing an optic recording medium in which at least one hollow zone is formed in a stack of at least one upper layer and one lower layer, the method comprising the following successive steps:

patterning of the upper layer to form at least a first hollow region passing through the upper layer, forming an etching mask on the patterned upper layer, consisting of:

depositing a layer of a positive acting photosensitive resin and exposing it to an optic radiation of a predetermined first wavelength, on the patterned upper layer, the lower and upper layers of the stack being respectively transparent and opaque to the predetermined first wavelength, in exposing the positive acting photosensitive resin layer to the optic radiation through the stack, developing the resin positive acting photosensitive layer, etching the lower layer through the etching mask to form at least a second hollow region extending the first hollow region, and removing the etching mask, wherein, before the step of patterning the upper layer, the upper layer is formed of a material able to change phase or to change state, due to the action of heating caused by an optic radiation of a predetermined second wavelength different from the first wavelength.

\* \* \* \* \*